United States Patent Office 3,525,508
Patented Aug. 25, 1970

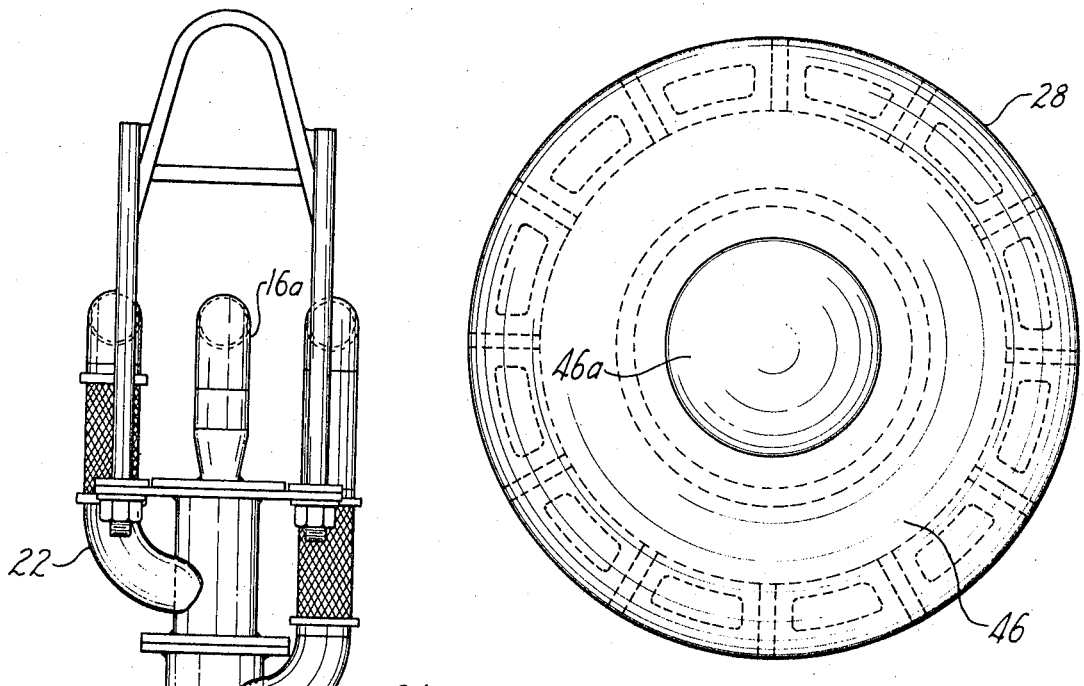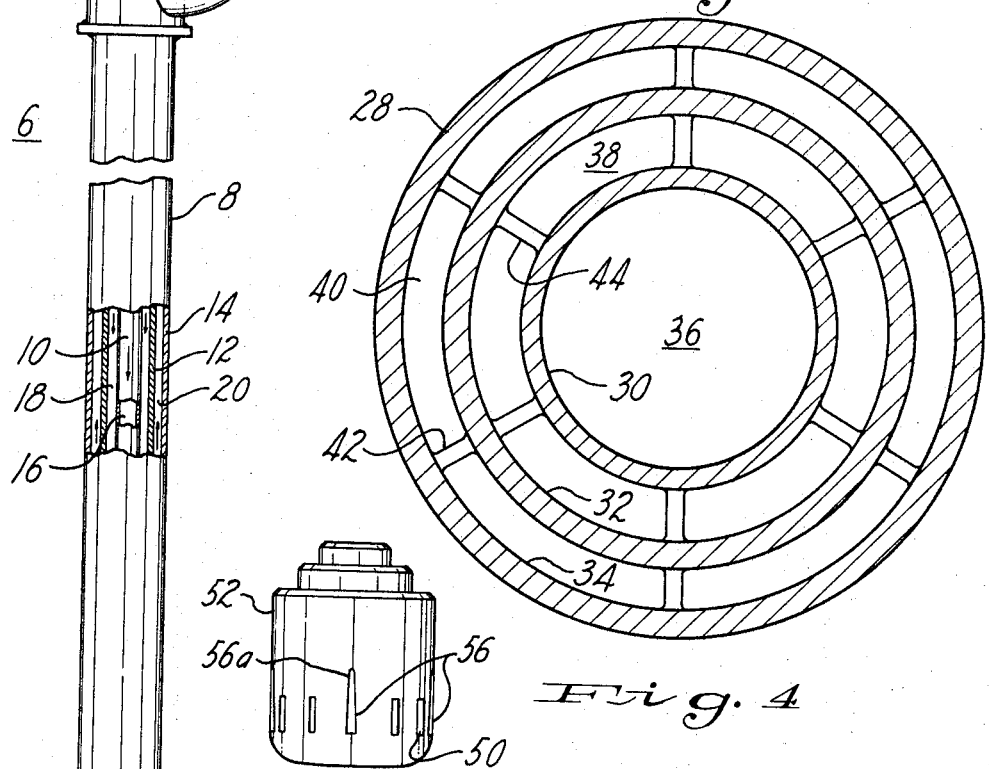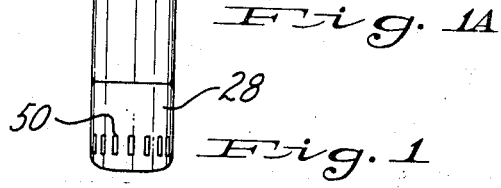

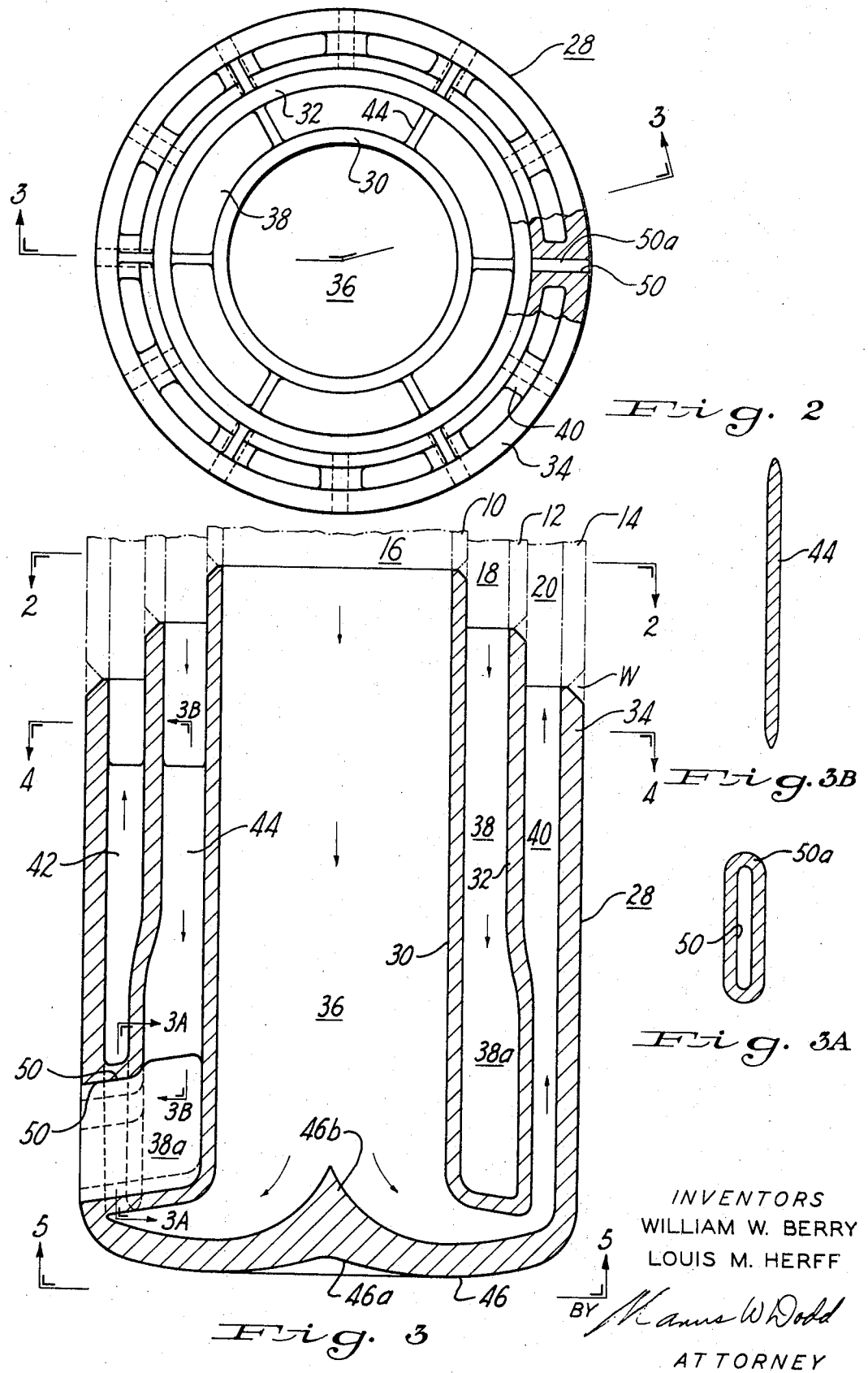

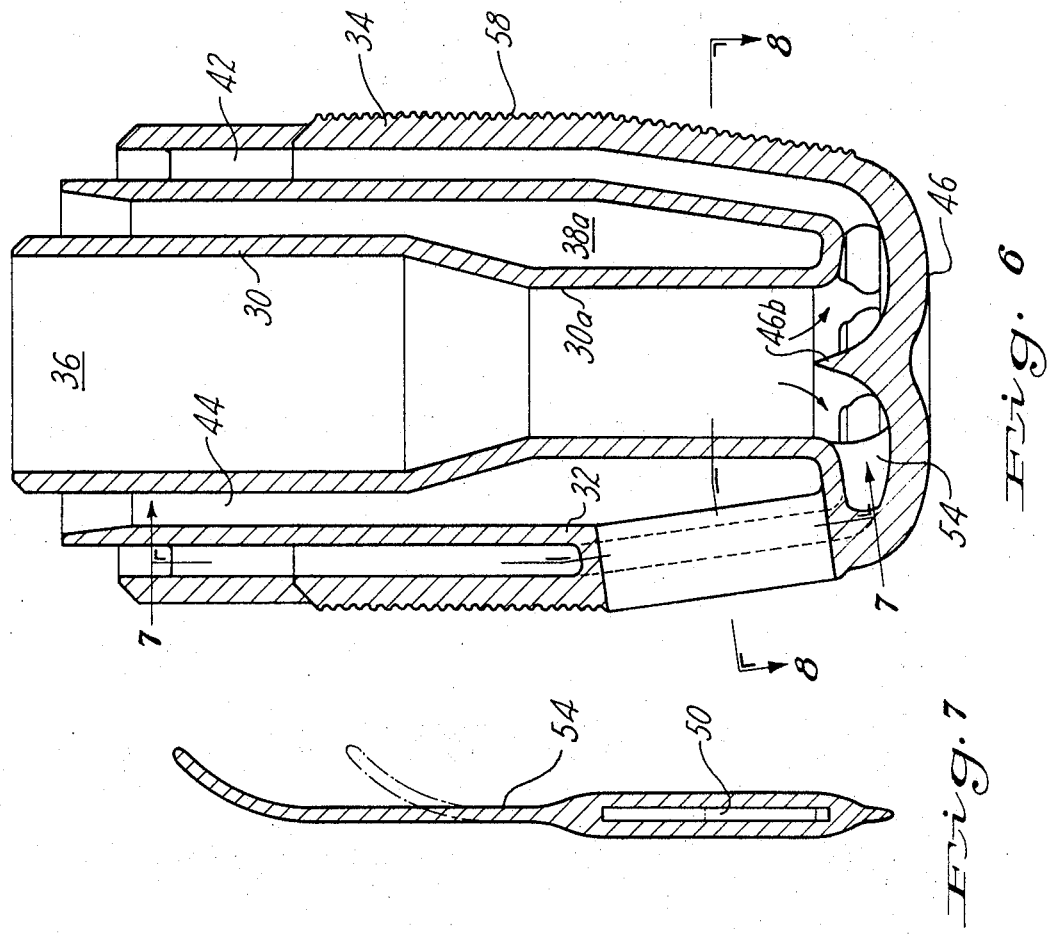
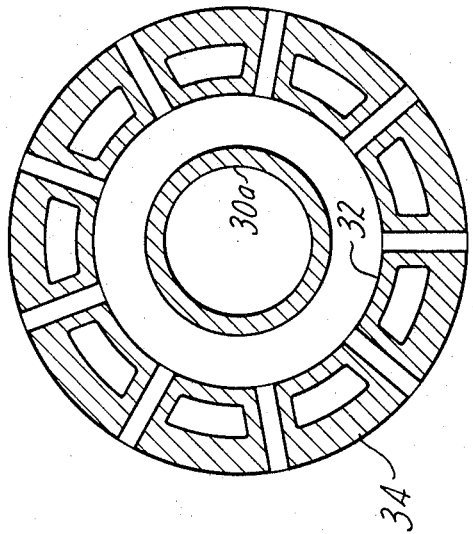

3,525,508
INJECTION LANCE WITH AN IMMERSIBLE NOZZLE
William W. Berry and Louis M. Herff, Pittsburgh, Pa., assignors to Berry Metal Company, Harmony, Pa., a corporation of Nevada
Filed Mar. 20, 1967, Ser. No. 624,287
Int. Cl. C21c *7/00, 5/32*
U.S. Cl. 266—34       14 Claims

ABSTRACT OF THE DISCLOSURE

This disclosure relates to fluid injection apparatus, and more particularly, pertains first, to an improved injection lance for supplying oxygen to a bath of molten metal in a steel-making furnace, and secondly, to an improved method of utilization that is generally applicable to the type of oxygen injection lance having a tip for sub-surface use.

The nozzle tip has a generally cylindrically-shaped outer side wall provided thereon with a plurality of oxygen outlet ports that are regularly positioned circumferentially about the body of the nozzle tip, each of which oxygen outlet ports of the nozzle tip is slot-shaped, with long dimensions thereof extending generally in the direction of the lance axis. An improved method of cooling is employed wherein the coolant is accelerated.

BACKGROUND OF THE INVENTION

Field of invention

The nozzle tip of an oxygen injection lance is typically subjected, during its operation, to a number of different stresses inherent to its operational environment. Such stresses effect an early deterioration of the nozzle tip and thus severely limit its usable life. One major detrimental factor that is encountered in the use of a sub-surface nozzle tip is in the constant washing action of the extremely turbulent motion of liquid steel, oxides and gases under and around the nozzle tip, which turbulence causes the gradual eroding away of the nozzle tip.

Another deteriorating factor resides in the stress created by the high thermal gradient that results from immersion of the nozzle tip in liquid steel submitted to an exothermic reaction. Further, the nozzle tip body experiences transient thermal stresses during the cooling period immediately subsequent to its operation. During the cooling period, the nozzle tip is also subjected to the stress of a contracting sleeve-like steel sheath that remains, as a deposit from the bath, encased around the body of the nozzle tip. The contracting steel sheath can exert a compressive force on the nozzle tip. The reaction to this force is a hoop stress in the nozzle tip body; this hoop stress could exceed the yield stress of the tip material and cause plastic flow. Also during the transient portion of the next heat cycle, cracking of the nozzle tip body may result from the triaxial tensile stresses to which the nozzle is submitted by the expanding steel sheath.

Therefore, it has been an objective of this invention to devise a new construction for an oxygen lance having an immersible nozzle tip, with such construction including improved gas and liquid flow systems inherently capable of reducing the effect of the aforementioned detrimental stress factors. In addition, another objective is a new construction which will create a more efficient furnace operation.

A person skilled in the art is aware that because of bath turbulence, smoke fumes and other resultant conditions of reaction in the furnace, visual regulation or control of immersion depth of a lance nozzle tip with respect to the bath surface is extremely difficult. Thus, a further objective of this invention has been to devise an improved means for reliable regulation of nozzle tip immersion depth that will operate regardless of the surface height of the bath within the confines of the furnace.

Description of the prior art

Injection lances for use in steelmaking furnaces have generally comprised a cylindrical tube with water cooling and gas passageways. These have been refined to improve lance life by several configurations such as that shown in Jilek et al. Pat. No. 3,241,825 (for use with admixtures), Berry Pat. No. 3,201,104, Eibl Pat. No. 3,216,714, and Hinds Pat. No. 3,020,035. These have employed circular outlet ports directed downward generally parallel to the axis of the lance, and arranged around the bottom or face of the nozzle tip.

SUMMARY OF THE INVENTION

This invention comprises an improved lance for use in a steel furnace comprising a plurality of oxygen outlet port channels radially around the nozzle tip sides preferably distant from the face of the lance and having a slot-like configuration defined as follows:

(a) Length—being the distance generally parallel to the lance axis.
(b) Width—being the distance along the circumference in a plane perpendicular to the lance axis.
(c) Depth—generally being the radial distance measured on the radius of the lance.

The ratio of length to width shall be equal or larger than 3 to 1, and the ratio of depth to width shall be equal to or larger than 5 to 1; preferably these slots are of a plurality of different lengths.

Internally the water flow conduit is arranged to have a restricted portion therein in the cold water channel near the face of the nozzle tip, so as to accelerate the water and increase the Reynold's number. In addition vanes are provided inside the outer shell of the nozzle tip for causing the return flow of water to spiral upward.

These and other features will better be understood by the more detailed explanation below.

DESCRIPTION OF THE DRAWINGS

FIG. 1 is an elevational view of an entire lance assembly in accordance with this invention;

FIG. 1A is an elevational view of an alternate construction for a nozzle tip in accordance with this invention;

FIG. 2 is a plan view of the nozzle tip of the lance assembly taken from the open end of the nozzle tip that is adapted to be joined to the lance shank, and is taken on line 2—2 of FIG. 3.

FIG. 3 is an elevational view of the lance nozzle tip in cross-section as taken on line 3—3 of FIG. 2;

FIG. 3A is a portion of the nozzle tip body shown in vertical section, as taken along line 3A—3A of FIG. 3;

FIG. 3B is a vertical sectional view of a portion of the nozzle tip body as taken along line 3B—3B of FIG. 3;

FIG. 4 is a full showing in horizontal section of the nozzle tip body as taken along line 4—4 of FIG. 3;

FIG. 5 is a full plan view of the face end of the nozzle tip body as taken along line 5—5 of FIG. 3;

FIG. 6 is a cross-sectional showing of a nozzle tip in accordance with a preferred embodiment of our invention;

FIG. 7 is a showing in cross-section of a vane taken along the line 7—7 of FIG. 6; and FIG. 8 is a cross-sectional showing of a lance tip taken along the line 8—8 of FIG. 6.

DESCRIPTION OF THE PREFERRED EMBODIMENTS

In FIG. 1 there is shown an oxygen injection lance assembly 6 comprising a bail assembly for supporting and extending a shank 8 downward into a steelmaking furnace whereby a nozzle tip 28 may be partially immersed into the molten steel bath of the furnace to distribute oxygen therein by means of jets emitted from a plurality of radially-disposed oxygen outlet ports 50 beneath the surface of the bath.

The shank 8 comprises three concentric pipes or tubes 10, 12 and 14. The innermost central tube 10 defines therein a coolant passage 16 for conducting a coolant flow from an overhead coolant inlet connection 16a and downward to the nozzle tip 28. In cooperation with the outer wall of the tube 10, the intermediate tube 12 defines an annulus or oxygen passage 18 through which an oxygen flow is conducted from an overhead oxygen inlet connection 22 and downward through oxygen passage 18 in the shank to the nozzle 28. The outer shank wall or tube 14 defines, in cooperation with the intermediate tube 12, an outer annulus or coolant exit passageway 20 for conducting a flow of coolant from the nozzle tip 28 outward through an overhead coolant outlet connection 24.

In FIGS. 1, 2, and 3 it will be seen that the nozzle tip 28 in accordance with one embodiment of our invention is a rigid body 28 formed from a metallic composition such as copper. The nozzle tip body 28 broadly comprises an outer cylindrical wall 34, an intermediate wall portion 32 and an inner wall portion 30, all of which are positioned to be respectively joined by means of annular welds to the shank tubes 14, 12 and 10. Thus the shank central passageway 16 is in communication with a substantially large central bore or coolant inlet passageway 36, the shank's intermediate annulus 18 is in flow communication with an oxygen passageway 38 and the water return passageway 20 is in communication with the coolant outlet passageway 40 of the nozzle tip body 28.

With specific reference to FIG. 3, it will be noted that the annular oxygen inlet passage 38 widens outwardly at its lower end to form an oxygen settling chamber region 38a. From the oxygen settling region 38a, a plurality of laterally directed port wall portions 50a lead outwardly to respective oxygen outlet ports 50.

In accordance with one embodiment of our invention as shown in FIG. 1A, we provide that every third slot is substantially elongated, about twice as long as the short slots. Every third slot thus is elongated and slightly tapered so as to be narrower on the upper end. The long slots are of 3.25" in length, thus with this arrangement the slots extend with their long dimension parallel to the axis of the lance and are arranged so that each long or elongated slot or oxygen outlet port 56a has two short oxygen outlet ports 50 adjacent thereto, i.e., there are two short outlet ports between succeeding long outlet ports. These ports are located on the lance nozzle tip near the face of the nozzle tip being distant a little less than an inch from a line across the face of the nozzle tip and at a right angle to the axis of the nozzle tip or, described differently, they are located so as to commence substantialy at the termination of the curved or tapered portion of the nozzle tip face or bottom.

In accordance with a preferred embodiment of our invention, as shown in FIGS. 6 to 8, we provide a central conduit 36 for water which is tapered inward distant from the face of the nozzle tip. This taper produces a restriction to approximately one-half the cross-sectional area of the main channel 36 of the water and the restricted area continues for a distance whereby its length to diameter is in a ratio of at least 2 to 1. It will be noted that the restriction in the water channel near the tip of the lance also produces an enlargement of the oxygen channel and creates an oxygen settling chamber 38a.

Inside of the nozzle tip the oxygen conduits, leading to the exit ports are of slot-like internal cross-sectional configuration the same as the outlet ports. Further in accordance with the embodiment of our invention as shown in FIG. 6, we provide that the oxygen outlet channels have a component of direction downward toward the bottom face of the nozzle tip of approximately 5 to 15 degrees from the perpendicular to the axis of the lance so that the downward components of direction compensate for the natural buoyancy of the gas stream ejected from the lance into the molten metal. The oxygen outlet channels 50 are shaped with an outside configuration cross-sectionally substantially in an oval shape but varied slightly so as to produce streamlined surfaces to the flow of water as shown in FIG. 7. Outside of the oxygen outlet channels we provide vanes 54 which extend up along the water exit conduit in a generally spiraling configuration with an increasing slope from the vertical and with with an average slope such that they would spiral completely around the lance in a distance up the lance equal to approximately two and one-half times the diameter of the lance. These vanes extend between the outside shell 34 of the lance and the adjacent intermediate oxygen jacket 32 so as to produce a spiraling wall between the outside shell of the lance and the adjacent oxygen jacket 32.

In accordance with a preferred embodiment of our invention as shown in FIG. 7, the oxygen outlet conduits and the water deflecting vanes are joined together so as to form hollow streamlined curved vanes wherein the hollow portions of the vanes constitute the oxygen outlet channels.

In accordance with another preferred embodiment of our invention, we provide the outside shell of the lance being tapered inward preferably at about 10 degrees toward the nose of the nozzle tip a distance from the bottom face of the lance approximately equal to the diameter of the lance. In addition, in accordance with another embodiment, we provide a plurality of small circular rings 58 around the outside of the nozzle tip for a distance upward approximately twice the diameter of the lance from the bottom face of the lance. These rings 58 are small being approximately one-quarter inch from top to top as measured along the axis of the lance and are approximately one-eigth inch in depth in a generally sine wave configuration along the axis of the lance.

In the operation of apparatus in accordance with our invention, water flows down through the central tube 10 of the shank to the face of the nozzle tip at which point, as shown more clearly in FIGS. 3 and 6, the water contacts a substantially conical projection 46b in the center of the face tending to cause the water to flow radially outward toward the outside areas of the nozzle tip in a manner that is turbulent but which has an absence of dead water zones. The water flows thus across the face of the nozzle tip in a substantially unimpeded manner so that substantially the entire face of the nozzle tip has a rapid water flow across it so as to produce a maximum cooling at the face. Thus, whereas the usual practice of the prior art provides oxygen outlet ports in the bottom face of the nozzle tip, which outlet ports obstruct the flow of water across the face, and, therefore, interfere with the cooling of the face, in the present lance, with radial flow, water is unimpeded because there are no oxygen outlet channels through the bottom face of the nozzle tip. The water flows outward in a manner free of dead zones to the outside cylindrical walls of the nozzle tip where the water turns and is led and moves upward around the streamlined oxygen outlet channels along the sides of the nozzle tip and also around the radial reinforcing pieces or the vanes extending between the outside wall of the nozzle tip and the outside wall of the intermediate tube within the nozzle tip.

The oxygen flows down the shank of the lance through the intermediate channel into the settling chamber 38a and through the interconnecting nozzles or outlet channels in the hollow of the vanes into the liquid metal being processed. The oxygen flow outward through the sides of the nozzle tip is through a plurality of small slots so that the oxygen stream is substantially broken up into the large number of small streams placed all around the lance. Since the oxygen is shooting out in a lateral manner from the lance, there is a side range of interaction laterally from the nozzle tip with relatively little depth or side penetration of the bath. Depth of penetration therefore is controlled by the depth to which the nozzle tip is lowered into the bath and side penetration is limited by the small streams rapid loss of kinetic energy. If the nozzle tip is held so that outlet ports are just below the surface of the bath, then substantially all of the interaction will be at or just below the surface of the bath and close to the lance. Due to this concept of supplying oxygen to the bath, the lining of the furnace is substantially protected and the interaction between the oxygen and the bath is carried on at a high rate without unreasonably damaging the lining of the furnace. This also reduces or eliminates the contamination of the oxygen by impurities which happens when the oxygen is imparted to the steel from above the bath.

As a nozzle tip is lowered into the furnace, the interaction of the bath and the nozzle tip causes a coating of steel to freeze on the sides of the nozzle tip. These coatings are sometimesc referred to as banding. The banding material produces a very strong layer of material around the nozzle tip and, when cooling, this frozen layer of steel on the copper tip could create compressive stresses, exceeding the yield stress of the nozzle tip. During the transient portion of the following heat cycle the plastically deformed copper would be submitted to triaxial tensile stresses and cracking could occur after a few thermal cycles. By the design of our oxygen slots the frozen steel layer on the cylindrical part of the tip is broken into segments and banding cannot occur in the vicinity of the slots. Also, the long, narrow slots or oxygen outlet ports extending in an axial direction along the lance permit the discharge of some oxygen above the bath surface. The combustion of CO will shroud the lower part of the lance with flame and reduce slag and steel build-up by encouraging the build-up to melt and return to the bath.

In addition, the slots will provide visual and audible immersion depth control. As the lance is lowered into the bath a change in sound level occurs as the short slots become immersed and leaving only part of the longer slots extending above the bath. There will also be a visual indication of depth by the change in the number of visible jet wakes as the lance is lowered into the bath. The wake from the long slots will remain visible after the wakes from jets issuing from the short slots have ceased due to immersion of the short slots.

The use of the slots as described herein having preferably a length to width ratio of at least 3 to 1, produces a number of distinct advantages. First we have observed that by the use of the slot configuration we are able to attain a much shorter supersonic core than is possible with a round hole of the same area. By having a shorter supersonic core plus immersion the lance with given rate of flow of oxygen produces substantially less agitation in the bath. By this reduction of agitation, while injecting the same amount of oxygen per unit time into the bath and causing the complete interaction of that oxygen with the bath, we obtain a number of advantages including a substantial increase in the life of the lining of the furnace and much less splashing toward the roof of the furnace and toward the upper portions of the lance shank. The shortening of the supersonic core with this configuration of the lance causes a smaller ring vortex of motion in the gases above the surface of the steel and around the lance; therefore matter emitted from the bath follows a path of smaller radius of curvature and either strikes the shank of the lance a short distance above the surface of the bath where it melts off, or else falls harmlessly back into the bath. By having a small ring vortex the sculling occurs near the surface of the bath in the flame shroud and the damaging effect of build-up caused by splashing is thereby substantially reduced. Build-up is limited by remelting of the scull material. (The sculling is the build-up of molten material cooling on the sides of the lance.)

The slots are oriented so as to eject oxygen at substantially right angles to the axis of the lance or parallel to the surface of the bath except for a slight downward direction. In accordance with one embodiment of our invention the direction of the oxygen stream emitted is approximately 5 to 15 degrees and preferably of about 8 degrees below the horizontal so as to counteract by the downward component of velocity of oxygen the natural buoyancy of the stream of oxygen.

By immersing the lance in the bath we produce a rotational flow of the steel in the furnace. Thus the steel in the furnace is caused to move outward from the lance by the effect of the oxygen jets, to then flow downward, back in, and up toward the bottom face of the lance. The bottom face of the immersed lance is presented with a flow of coolest steel in the cycle. We have found that by this flow arrangement, the lance life is substantially increased.

In the lances of the prior art with round oxygen channels in the coolant stream there are dead water zones which are highly undesirable. Prior art reduces these dead water zones by reducing the water velocity which also reduces cooling. We have therefore provided a long thin oxygen channel which is so profiled as to be streamlined and to produce substantially no dead water at high velocity in the coolant channel.

We have concluded that it is desirable to increase the Reynolds number for the coolant flow to an amount larger than 100,000 prior to reaching the tip of the lance so as to obtain turbulent flow and to maintain that turbulent flow throughout substantially beyond the entire nozzle tip of the lance. We have therefore built a lance which produces a high velocity turbulent flow and which encourages the flow to remain continuously turbulent through and beyond the tip of the lance by continuous reduction of area.

In addition, in the cooling mechanism, we are of the opinion that a maximum cooling can be accomplished at those points where a centrifugal force may be maintained at a maximum. Thus the water is caused to move downward along the longitudinal length of the lance until it reaches the tip at which point a high centrifugal acceleration is applied to the water by the natural change in direction at the face of the nozzle tip. This causes the steam bubbles collected on the wall of the lance to move from the outside regions toward the interior of the lance under the pressure gradient due to the centrifugal force, somewhat in the manner in which water boiling causes bubbles to move from the bottom of the vessel to the surface by the force of gravity. In the nozzle tip we are able to obtain the desired centrifugal force merely by the simple requirement that the water must change direction by moving downward and then back up. As the water moves back up along the side walls of the nozzle tip, there is no natural centrifugal force. We have, therefore, provided a plurality of vanes for causing the water to move rotatably about the major axis of the lance so as to produce a centrifugal force. The combination of centrifugally created pressure gradient and high turbulence preserves nucleate boiling on the hot wall and a detrimental film boiling mechanism could not develop.

It will be noted that we were concerned with the problems of injury to the nozzle tip by steel coating on the outside of the lance and freezing so as to form a tight ring above the slots which would crush the nozzle tip. It was therefore desirable to obtain some type of increased structural strength inside of the nozzle tip so as to diminish the possible damages due to the steel ring on the outside of the nozzle tip. We have found that supports were necessary between the outer wall and the next interior wall so as to protect the outer wall from being crushed. Subsequently, we have realized that this problem and the problem of scrubbing steam bubbles from the inside surface could be accomplished both by the same apparatus, namely, by having vanes between the two walls of the exit water passage and by having these vanes oriented so as to cause the flow of water to rotate about the axis of the lance.

An enlarged area is provided near the face of the tip of the lance which acts as a settling chamber to smooth out the flow of oxygen. It will be noted that for proper oxygen expansion in the nozzle tip we need a ratio of depth of the oxygen output channel to width of the channel which is at least 5 to 1, in order to obtain laminar flow. The characteristic dimension of a slot is its width or smaller cross sectional dimension. Thus the depth of the oxygen output channel from the interior of the tip to the outer surface of the tip for the oxygen is easily maintained at its desired relationship, i.e., where the width of the slot is ⅕ of the depth of the slot.

The small annular ribs on the outside of the lance tip encourage a build-up of non-injurious structurally weak impurities such as slag on the sides of the tip which impurities have an insulating effect and tend to reduce the temperature of the copper, thereby forming a protective coating on the nozzle tip.

What we claim is:

1. In an oxygen injection lance having a substantially elongated shank and a nozzle tip for use in a high temperature furnace, said nozzle comprising: a face end, an open end for connection to the shank, an outer side wall, at least a portion thereof being of generally cylindrical shape, said outer side wall being between said open end and said face end, a plurality of oxygen outlet ports opening from said side wall as distinguished from said face end, said face end being solid, said oxygen outlet ports being spaced circumferentially about the axis of said lance and being of slot-like configuration.

2. Apparatus as described in claim 1 wherein the apertures of said oxygen outlet ports have a ratio of length to width of at least three to one.

3. An oxygen lance as defined in claim 2, wherein: said lance comprises three substantially concentric pipes in spaced relation to each other, the inner pipe defining a water supply conduit, the outer pipe defining a shell, and the intermediate pipe defining with the inner pipe an oxygen passageway and defining with the outer pipe a water return passageway, oxygen channels extending from said intermediate pipe at the nozzle tip of said lance, said channels having an inner cross-section of slot-like configuration corresponding to said oxygen output ports and having an outer cross-sectional configuration which is streamlined for flow of coolant thereby.

4. Apparatus as defined in claim 3, wherein coolant deflectors are provided which extend upward in a spiralling manner toward the shank of said lance in said water return passageway and extending radially between said intermediate pipe and said outer pipe.

5. A lance as described in claim 4 wherein said coolant deflectors and said oxygen outlet channels are connected so as to form a streamlined unit in the water channel.

6. A lance as described in claim 3, wherein said inner pipe is restricted in diameter near the face of said lance to form a cross-sectional area approximately one-half the cross-sectional area of the main body of said inner pipe.

7. A lance as defined in claim 1 wherein said oxygen outlet ports and the channels connected therewith are of a configuration to cause a stream of gas ejected therefrom to be at an angle between zero and 15 degrees below the normal to the axis of said lance.

8. A lance as defined in claim 1 wherein some of said slots are substantially longer than other of said slots.

9. An oxygen injection lance nozzle tip comprising an outer coolant channel which is adjacent to the outside wall thereof, a plurality of vanes in said coolant channel, said vanes having their lower end near the face of said nozzle substantially parallel to the axis of said nozzle and then being curved so as to have a slope with increasing distance from the face.

10. A nozzle tip as defined in claim 9 wherein an inner coolant supply channel has a restricted cross-section near the face of said lance.

11. A nozzle tip as described in claim 9 wherein oxygen outlet channels extend through said outer coolant channel and have a streamlined outer wall.

12. The oxygen injection lance nozzle tip of claim 1 wherein said side wall is substantially covered by indentations of at least one-sixteenth of an inch in depth.

13. A nozzle tip as defined in claim 12 wherein said indentations are in the form of annular rings.

14. A lance nozzle tip as defined in claim 1 wherein said oxygen outlet ports issue from oxygen channels having a depth to width ratio of at least five to one.

References Cited

UNITED STATES PATENTS

| | | | |
|---|---|---|---|
| 2,863,656 | 12/1958 | Cox. | |
| 3,130,252 | 4/1964 | Metz | 266—134 X |
| 3,334,885 | 8/1967 | Taylor | 266—35 |
| 3,043,577 | 7/1962 | Berry | 239—132.3 |
| 3,309,195 | 3/1967 | Hutton | 266—34 X |
| 3,310,238 | 3/1967 | Bryant et al. | 239—132.3 |
| 3,322,419 | 5/1967 | Smith et al. | 266—34 |
| 3,385,586 | 5/1968 | Mueller | 266—34 |

FOREIGN PATENTS

| | | |
|---|---|---|
| 1,229,812 | 9/1960 | France. |

J. SPENCER OVERHOLSER, Primary Examiner

R. S. ANNEAR, Assistant Examiner

U.S. Cl. X.R.

239—566, 568, 132.3

UNITED STATES PATENT OFFICE
CERTIFICATE OF CORRECTION

Patent No. 3,525,508              Dated August 25, 1970

Inventor(s) William W. Berry and Louis M. Herff

It is certified that error appears in the above-identified patent and that said Letters Patent are hereby corrected as shown below:

Column 1, line 6, the word "Nevada" should read ---Delaware---.

SIGNED AND
SEALED
OCT 27 1970

(SEAL)
Attest:

Edward M. Fletcher, Jr.
Attesting Officer

WILLIAM E. SCHUYLER, JR.
Commissioner of Patents